US007430653B1

(12) United States Patent
Tremblay

(10) Patent No.: US 7,430,653 B1
(45) Date of Patent: Sep. 30, 2008

(54) PIPELINED PROCESSOR WITH MULTI-CYCLE GROUPING FOR INSTRUCTION DISPATCH WITH INTER-GROUP AND INTRA-GROUP DEPENDENCY CHECKING

(75) Inventor: Marc Tremblay, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 855 days.

(21) Appl. No.: 09/583,097

(22) Filed: Aug. 2, 1999

Related U.S. Application Data

(63) Continuation of application No. 08/662,582, filed on Jun. 11, 1996, now Pat. No. 5,958,042.

(51) Int. Cl.
*G06F 9/38* (2006.01)
(52) U.S. Cl. ..................................... 712/216; 712/215
(58) Field of Classification Search ............... 712/214, 712/215, 216, 217
See application file for complete search history.

(56) References Cited

U.S. PATENT DOCUMENTS

| | | | |
|---|---|---|---|
| 5,127,093 A | 6/1992 | Moore, Jr. | |
| 5,193,167 A * | 3/1993 | Sites et al. | 711/163 |
| 5,202,975 A * | 4/1993 | Rasbold et al. | 717/151 |
| 5,295,249 A * | 3/1994 | Blaner et al. | 712/213 |
| 5,459,844 A | 10/1995 | Eickemeyer et al. | |
| 5,488,729 A | 1/1996 | Vegesna et al. | |
| 5,497,499 A | 3/1996 | Garg et al. | |
| 5,502,826 A | 3/1996 | Vassiliadis et al. | |
| 5,509,130 A | 4/1996 | Trauben et al. | |
| 5,522,084 A | 5/1996 | Ando | |
| 5,530,816 A | 6/1996 | Holt | |
| 5,546,593 A | 8/1996 | Kimura et al. | |
| 5,555,432 A * | 9/1996 | Hinton et al. | 712/23 |
| 5,560,028 A | 9/1996 | Sachs et al. | |
| 5,594,864 A | 1/1997 | Trauben | |
| 5,627,984 A | 5/1997 | Gupta et al. | |
| 5,742,783 A * | 4/1998 | Azmoodeh et al. | 712/212 |
| 5,958,042 A | 9/1999 | Tremblay | |

FOREIGN PATENT DOCUMENTS

EP  0 651 323 A1  5/1995

OTHER PUBLICATIONS

The Free On-line Dictionary of Computing, Copyright © 1993-2001. The definition of "non-deterministic" was obtained via dictionary.com.*
D. Sweetman: "Superscalar or superpipelined or just hype?" New Electronics, vol. 24, No. 11, Dec. 1, 1991, pp. 16-18, XP000310175.
V. Popescu et al.: "Metaflow Architecture" IEEE Micro, vol. 11, No. 3, Jun. 1, 1991, pp. 10-13, 63-73, XP000237231.
Hayes (Computer Architecture and organization) McGraw-Hill, pp. 592-622, Jun. 1988.

* cited by examiner

*Primary Examiner*—David J Huisman
(74) *Attorney, Agent, or Firm*—Osha • Liang LLP

(57) ABSTRACT

A pipelined instruction dispatch or grouping circuit allows instruction dispatch decisions to be made over multiple processor cycles. In one embodiment, the grouping circuit performs resource allocation and data dependency checks on an instruction group, based on a state vector which includes representation of source and destination registers of instructions within said instruction group and corresponding state vectors for instruction groups of a number of preceding processor cycles.

15 Claims, 2 Drawing Sheets

PIPELINED PROCESSOR WITH MULTI-CYCLE GROUPING FOR INSTRUCTION DISPATCH WITH INTER-GROUP AND INTRA-GROUP DEPENDENCY CHECKING

This application is a continuation of application Ser. No. 08/662,582, filed Jun. 11, 1996, now U.S. Pat. No. 5,958,042.

BACKGROUND OF THE INVENTION

1. Field of the Invention

This invention relates to computer architecture. In particular, this invention relates to the design of an instruction unit in a superscalar processor.

2. Discussion of the Related Art

Parallelism is extensively exploited in modern computer designs. Among these designs are two distinct architectures which are known respectively as the very long instruction word (VLIW) architecture and the superscalar architecture. A superscalar processor is a computer which can dispatch one, two or more instructions simultaneously. Such a processor typically includes multiple functional units which can independently execute the dispatched instructions. In such a processor, a control logic circuit, which has come to be known as the "grouping logic" circuit, determines the instructions to dispatch (the "instruction group"), according to certain resource allocation and data dependency constraints. The task of the computer designer is to provide a grouping logic circuit which can dynamically evaluate such constraints to dispatch instruction groups which optimally use the available resources. A resource allocation constraint can be, for instance, in a computer with a single floating point multiplier unit, the constraint that no more than one floating point multiply instruction is to be dispatched for any given processor cycle. A processor cycle is the basic timing unit for a pipelined unit of the processor, typically the clock period of the CPU clock. An example of a data dependency constraint is the avoidance of a "read-after-write" hazard. This constraint prevents dispatching an instruction which requires an operand from a register which is the destination of an write instruction dispatched earlier, but yet to be unretired.

A VLIW processor, unlike a superscaler processor, does not dynamically allocate system resources at run time. Rather, resource allocation and data dependency analysis are performed during program compilation. A VLIW processor decodes the long instruction word to provide the control information for operating the various independent functional units. The task of the compiler is to optimize performance of a program by generating a sequence of such instructions which, when decoded, efficiently exploit the program's inherent parallelism in the computer's parallel hardware. The hardware is given little control of instruction sequencing and dispatch.

A VLIW computer, however, has a significant drawback in that its programs must be recompiled for each machine they run on. Such recompilation is required because the control information required by each machine is encoded in the instruction words. A superscalar computer, by contrast, is often designed to be able to run existing executable programs (i.e., "binaries"). In a superscalar computer, the instructions of an existing executable program are dispatched by the computer at run time according to the computer's particular resource availability and data integrity requirements. From a computer user's point of view, because existing binaries represent significant investments, the ability to acquire enhanced performance without the expense of purchasing new copies of binaries is a significant advantage.

In the prior art, to determine the instructions that go into an instruction group of a given processor cycle, a superscalar computer performs the resource allocation and data dependency checking tasks in the immediately preceding processor cycle. Under this scheme, the computer designer must ensure that such resource allocation and data dependency checking tasks complete within their processor cycle. As the number of the functional units that can be independently run increases, the time required for performing such resource allocation and data dependency checking tasks grows more rapidly than linearly. Consequently, in a superscalar computer design, the ability to perform resource and data integrity analysis within a single processor cycle can be come a factor that limits the performance gain of additional parallelism.

SUMMARY OF THE INVENTION

The present invention provides a central processing unit which includes a grouping logic circuit for determining simultaneously dispatchable instructions in an processor cycle. The central processing unit of the present invention includes such a grouping logic circuit and a number of functional units, each adapted to executed one or more specified instructions dispatched by the grouping logic circuit. The grouping logic circuit includes a number of pipeline stages, such that resource allocation and data dependency checks can be performed over a number of processor cycles. The present invention therefore allows dispatching a large number of instruction simultaneously, while avoiding the complexity of the grouping logic circuit from becoming limiting the duration of the central processing unit's processor cycle.

In one embodiment, the grouping logic circuit checks intra-group data dependency immediately upon receiving the instruction group. In that embodiment, all instruction in a group of instructions received in a first processor cycle are dispatched prior to dispatching any instruction of a second group of instructions received at an processor cycle subsequent to said first processor cycle.

The present invention is better understood upon consideration of the detailed description below in conjunction with the accompanying drawings.

DETAILED DESCRIPTION OF THE PREFERRED EMBODIMENTS

Figure 1:
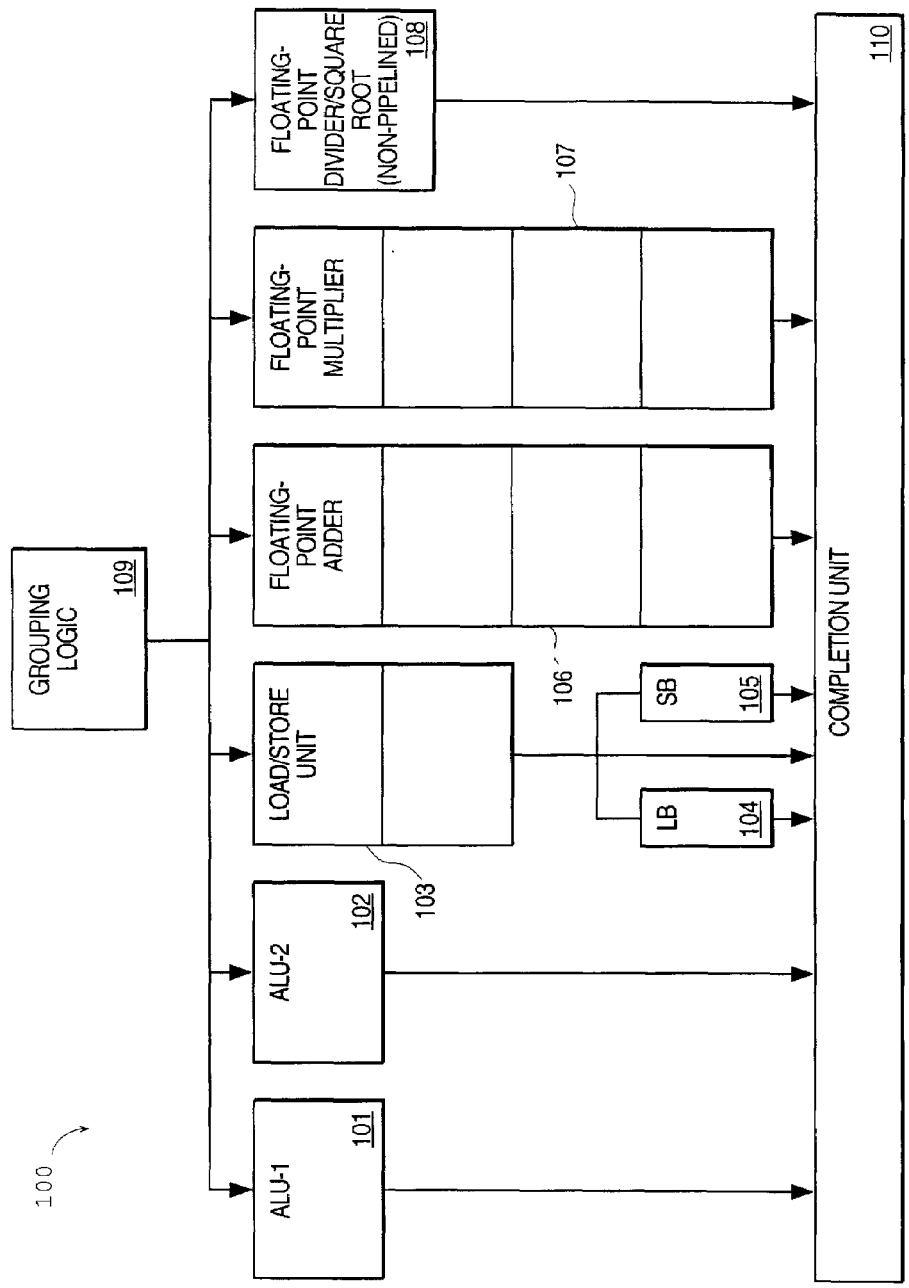
FIG. 1 is a block diagram of a CPU 100, in an exemplary 4-way superscalar processor of the present invention.

An embodiment of the present invention is illustrated by the block diagram of FIG. 1, which shows a central processing unit (CPU) 100 in an exemplary 4-way superscalar processor of the present invention. A 4-way superscalar processor fetches, dispatches, executes and retires up to four instructions per processor cycles. As shown in FIG. 1, central processing unit 100 includes two arithmetic logic units 101 and 102, a load/store unit 103, which includes a 9-deep load buffer 104 and an 8-deep store buffer 105, a floating point adder 106, a floating point multiplier 107, and a floating point divider 108. In this embodiment, a grouping logic circuit 109 dispatches up to four instructions per processor cycle. Completion unit 110 retires instructions upon completion. A register file (not shown), including numerous integer and float point registers, is provided with sufficient number of ports to prevent contention among functional units for access to this register file during operand fetched or result write-back. In this embodiment also, loads are non-blocking, i.e., CPU 100 continues to execute even though one or more dispatched laod instructions have not completed. When the data of the load instructions are returned from the main memory, these data can be placed in a pipeline for storage in a second-level cache. In this embodiment, floating point adder 106 and floating point multiplier 107 each having a 4-stage pipeline. Similarly, load/store unit 103 has a 2-stage pipeline. Floating point divider 108, which is not pipelined, requires more than one processor cycle per instruction.

To simplify the discussion below, the state of CPU 100 relevant to grouping logic 109 is summarized by a state variable S(t), which is defined below. Of course, the state of CPU 100 includes also other variables, such as those conventionally included in the processor status word. Those skilled in the art would appreciate the use and implementation of processor states. Thus, the state S(t) at time t of CPU 100 can be represented by:

$$S(t) = \{ALU_1(t), ALU_2(t), LB(t), SB(t), LS(t), FA(t), FM(t), FDS(t)\}$$

where $ALU_1(t)$ and $ALU_2(t)$ are the states, at time t, of arithmetic logic units 101 and 102 respectively; LS(t) and LB(t) are the states, at time t, of store buffer 105 and load buffer 104 respectively; FA(t), FM(t), and FDS(t) are the states, at time t, of floating point adder 106, floating point multiplier 107 and floating point divider 108 respectively.

At any given time, the state of each functional unit can be represented by the source and destination registers specified in the instructions dispatched to the functional unit but not yet retired. Thus, $$ALU_1 = \{ALU_1.rs1(t), ALU_1.rs2(t), ALU_1.rd(t)\}$$

where rs1(t), rs2(t) and rd(t) are respectively the first and second source registers, and the destination of registers of the instruction executing at time t in arithmetic logic unit 101.

Similarly, the state of arithmetic logic unit 102 can be defined as:

$$ALU_2 = \{ALU_2.rs1(t), ALU_2.rs2(t), ALU_2.rd(t)\}$$

For pipelined functional units, such as floating point adder 106, the state is relatively more complex, consisting of the source and destination registers of the instructions in their respective pipeline. Thus, for the pipelined units, i.e., load/store unit 103, load buffer 104, store buffer 105, floating point adder 106, and floating point multiplier 107, their respective states, at time t, LS(t), LB(t), SB(t), FA(t) and FM(t) can be represent by:

$$LS = \{LS.rs1_i(t), LS.rs2_i(t), LS.rd_i(t)\} \text{ for } i = \{1, 2\}$$

$$LB = \{LB.rs1_i(t), LS.rs2_i(t), LB.rd_i(t)\} \text{ for } i = \{1, 2, \ldots, 9\}$$

$$SB = \{SB.rs1_i(t), SB.rs2_i(t), SB.rd_i(t)\} \text{ for } i = \{1, 2, \ldots, 8\}$$

$$FA = \{FA.rs1_i(t), FA.rs2_i(t), FA.rd_i(t)\} \text{ for } i = \{1, \ldots, 4\}$$

Finally, floating point divider 108's state FDS(t)

$$FM = \{FM.rs1_i(t), FM.rs2_i(t), FM.rd_i(t)\} \text{ for } i = \{1, \ldots, 4\}$$

can be represented by:

$$FDS = \{FDS.rs1_i(t), FDS.rs2_i(t), FDS.rd_i(t)\}$$

State variable S(t) can be represented by a memory element, such as a register or a content addressable memory unit, at either a centralized location or in a distributed fashion. For example, in the distributed approach, the portion of state S(t) associated with a given functional unit can be implemented with the control logic of the functional unit.

In the prior art, a grouping logic circuit would determine from the current state, S(t) at time t, the next state S(t+1), which includes information necessary to dispatch the instructions of the next processor cycle at time t=1. For example, to avoid a read-after-write hazard, such a grouping circuit would exclude from the next state S(t=1) an instruction having an operand to be fetched from a register designated for storing a result of a yet incomplete instruction. As another example, such a grouping circuit would include in state S(t+1) no more than one floating point "add" instruction in each processor cycle, since only one floating point adder (i.e., floating point adder 106) is available. As discussed above, as complexity increases, the time required for propagating through the grouping logic circuit can become a critical path for the processor cycle. Thus, in accordance with the present invention, grouping logic circuit 109 is pipelined to derive, over $\tau$ processor cycles, a future state $S(t+\tau)$ based on the present state S(t). The future state $S(t+\tau)$ determines the instruction group to dispatch at time $t+\tau$. Pipelining group logic 109 is possible because, as demonstrated below, (i) the values of most state variables in the state $S(t+\tau)$ can be estimated from corresponding values of state S(t) with sufficient accuracy, and (ii) for those state variables for which values can not be accurately predicted, it is relatively straightforward to provide for all possible outcome of state $S(t+\tau)$, or to use a conservative approach (i.e. not dispatching an instruction when such an instruction could have been dispatched) with a slight penalty on performance.

The process for predicting state $S(t+\tau)$ is explained next. The following discussion will first show that most components of next state S(t+1) can be precisely determined from present state S(t( ), and the remaining components of state S(t) can be reasonably determined, provided that certain non-deterministic conditions are appropriately handled. By induction, it can therefore be shown that future state $S(t+\tau)$, where $\tau$ is greater than 1, can likewise be determined from state S(t).

Since an instruction in floating point adder 106 or floating point multiplier 107 completes after four processor cycles and an instruction in load/store unit 103 completes after two processor cycles, the states FA, FM and LS at time t+1 can be derived from the corresponding state S(t) at time t, the immediately preceding processor cycle. In particular, the relationship governing the source and destination registers of each instruction executing in floating point adder 106, floating point multiple 107 and load/store unit 103 between time t+1 and time t are:

$$rs1_i(t+1) = rs1_{i-1}(t), \text{ for } 1 > i \leq k$$

$$rs2_i(t+1) = rs2_{i-1}(t), \text{ for } 1 > i \leq k$$

$$rd_i(t+1) = rd_{i-1}(t), \text{ for } 1 > i \leq k$$

where k is the depth of the respective pipeline.

The state FDS(t+1) of floating point divider 108, in which the time required to execute an instruction car exceed a processor cycle, is determined from state FDS (t) by:

$$FDS(t+1) = FDS(t) \text{ \{if last stage\} else null}$$

Whether or not floating point divider 108 is in its last stage can be determined from, for example, a hardware counter or a state register, which keep tracks of the number of processor cycles elapsed since the instruction in floating point divider 108 began execution.

In load buffer 104 and store buffer 105, since the pending read or write operation at the head of each queue need not complete within one processor cycle, the state LB(t+1) at time t+1 cannot be determined from the immediately previous state LB(t) at time t with certainty. However, since state LB(t+1) can only either remain the same, or reflect the movement of the pipeline by one state, two possible approaches to determine state LB(t+1) can be used. First, a conservative approach would predict LB(t+1) to be the same as LB(t). Under this approach, when load buffer 104 is full, an instruction is not dispatched until the pipeline in load buffer 106 advances. An incorrect prediction, i.e. a load instruction completes during the processor cycle of time t, this conservative approach leads to a penalty of one processor cycle, since a load instruction could have been dispatched at time t+1. Alternatively, a more aggressive approach provides for both outcomes, i.e. load buffer 104 advances one stage, and load buffer 104 remains the same. Under this aggressive approach, grouping logic 109 is ready to dispatch a load instruction, such dispatch to be enabled by a control signal which indicates, at time t+1, whether a load instruction has in fact completed. This aggressive approach requires a more complex logic circuit than the conservative approach.

Thus, the skilled person would appreciate that state S(t+1) of CPU 100 can be predicted from state S(t). Consequently, both the number of instructions and the types of instructions that can be dispatched at time t+1 (i.e. the instruction group at the time t+1) based on predicted state S(t+1) can be derived, at time t, from state S(t), subject to additional handling based on the actual state $S_A(t+1)$ at time t+1.

The above analysis can be can be extended to allow state $S(t+\tau)$ at time $t+\tau$ to be derived from state S(t) at time t. The instruction group at time $t+\tau$ can be derived from time t, provided that, for each instruction group between time t and $t+\tau$, all instruction from that instruction group must be dispatched before any instruction from a subsequent instruction group is allowed to be dispatched (i.e. no instruction group merging).

Since instructions from different instruction groups are not merged, intra-group dependencies and inter-group dependencies can be checked in parallel. The instructions are either fetched from an instruction cache or an instruction buffer. An instruction buffer is preferable in a system in which not all accesses (e.g. branch instructions) to the instruction cache are aligned, and multiple entry points in the basic blocks of a program are allowed.

Figure 2:
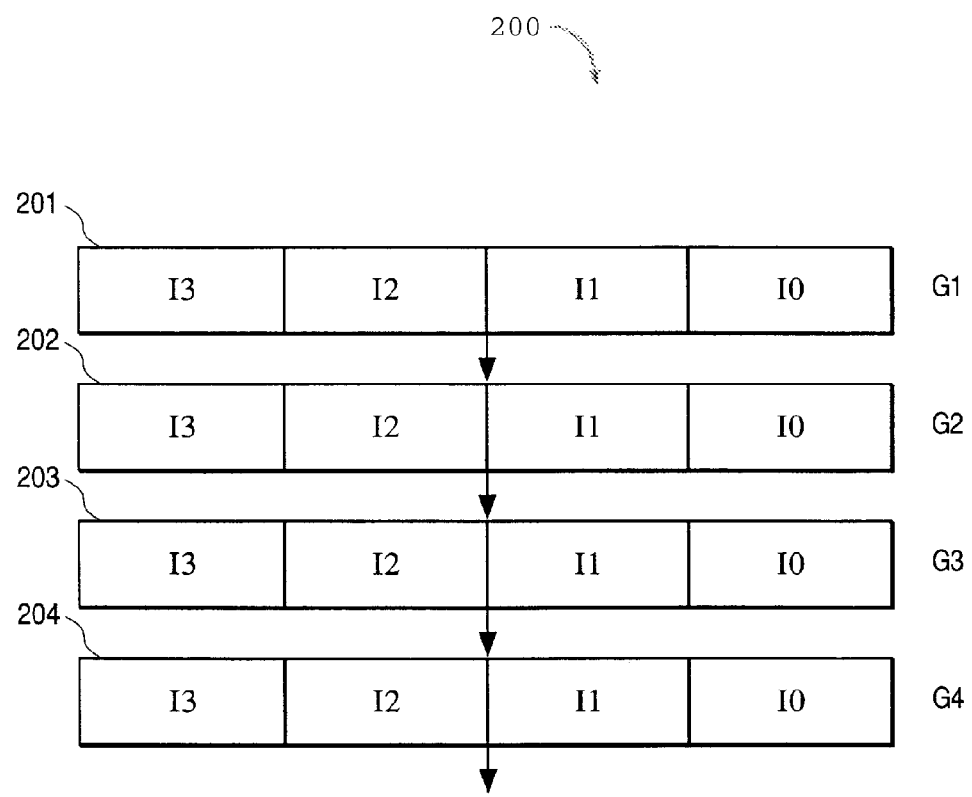
FIG. 2 shows schematically a 4-stage pipelined grouping logic circuit 109 in the 4-way superscalar processor of FIG. 1.

Once four candidate instructions for an instruction group are identified, intra-group data dependency checking can begin. Because of the constraint against instruction group merging described above, i.e., all instructions in an instruction group must be dispatched before an instruction from a subsequent instruction group can be dispatched, intra-group dependency checking can be accomplished in a pipelined fashion. That is, inter-group dependency checking can span more than one processor cycle and all intra-group dependency checking. For the purpose of intra-group dependency check, each instruction group can be represented by:

IntraS(t)={rs1$_i$(t), rs2$_i$(t), rd$_i$(t), res$_i$(t)} for 0≤i>w−1 where W is the width of the machine, and res$_i$ represents the resource utilization of instruction I. An example of a four-stage pipeline 200 is shown in FIG. 2. In FIG. 2, at first stage 201, as soon as the instruction group is constituted, intra-group dependency checking is performed immediately. Therefore, at stage 202, resource allocation within the instruction group can be determined. At stage 203, intergroup decisions, e.g. resource allocation decisions taking into consideration resource allocation in previous instruction groups, are merged with the decisions at stages 201 and 202. For example, if the present instruction group includes an instruction designated for floating point divider 108, stage 203 would have determined at by this time if a previous instruction using floating point divider 108 would have completed by the time the present instruction group is due to be dispatched. Finally, at stage 204, non-deterministic conditions, e.g. the condition at store buffer 105, is considered. Dispatchable instructions are issued into CPU 100 at the end of stage 204.

The above detailed description is provided to illustrate the specific embodiments of the present invention and is not intended to be limiting. Numerous variations and modifications within the scope of the present invention are possible. The present invention is defined by the following claims.

I claim:

1. A superscalar processor that, for a given instruction instance, performs, over plural execution cycles of the superscalar processor, instruction grouping for dispatch, including both intra-group and inter-group dependency checking, wherein the instruction grouping for dispatch takes the plural execution cycles to complete, wherein non-deterministic conditions are evaluated in a final stage of instruction grouping prior to dispatch.

2. A processor comprising:
plurality functional units that execute instructions in respective numbers of processor cycles; and
grouping logic coupled to the functional units and pipeline to compute, over plural cycles, T, of the processor, a future state, S(t+T), of the processor based on a prior state, S(t), of the processor and based thereon to select a group of instructions from a program sequence thereof for dispatch to the functional units,
wherein the future state computing takes the plural cycles to complete.

3. The processor of claim 2, further comprising:
wherein intra-group dependency checking by the pipelined grouping logic spans two or more of the T cycles.

4. The processor of claim 2, further comprising:
wherein inter-group dependency checking is performed independently of intra-group dependency checking.

5. The processor of claim 2,
wherein intra-group dependencies are checked by the pipelined grouping logic beginning in a first of the T cycles; and
wherein non-deterministic dependency conditions are checked during a last of the T cycles.

6. The processor of claim 5,
wherein inter-group dependencies are checked independent of the intra-group dependencies.

7. The processor of claim 2,
wherein the group logic implements T stages of a pipeline of the processor.

8. The processor of claim 2,
wherein T is four.

9. The processor of claim 2,
wherein the functional units include at least one functional unit capable of receiving and completing an instruction for each of the processor cycles.

10. The processor of claim 2,
wherein the functional units include at least one functional unit requiring multiple of the processor cycles for receiving and completing an instruction.

11. A method of operating a processor, the method comprising:
- identifying successive groups of instructions for dispatch to respective ones of plural execution units of the processor;
- performing, during plural pipelined execution cycles of the processor, dependency checking amongst instructions of a later one of the groups and between the instructions of the later group and instructions of a preceding one of the groups; and
- dispatching instructions of the later group only after all instructions of the preceding group have been dispatched,
- wherein the performed dependency checking takes the plural pipelined execution cycles to complete, and wherein non-deterministic conditions are evaluated in a final one of the pipelined execution cycles implemented by pipelined grouping logic.

12. A method of grouping instructions for dispatch to execution units of a processor, the method comprising:
- in a first cycle of processor execution, identifying plural candidate instructions for an instruction group;
- in a subsequent cycle of processor execution, beginning intra-group dependency checking amongst instructions of the instruction group;
- in a cycle of processor execution prior to dispatch of any instruction from the instruction group, checking non-deterministic conditions; and
- in a cycle of processor execution prior to the non-deterministic dependency condition checking, initiating inter-group dependency checking between instructions of the instruction group and instructions of one or more prior instruction groups,
- wherein, for instruction instances of the instruction group, dependency checking, which includes the intra-group dependency checking and the inter-group dependency checking, takes plural of the cycle of processor execution to complete.

13. The method of claim 12, further comprising:
dispatching one or more instructions of the instruction group only after all instructions of the one or more prior instruction groups have been dispatched.

14. The method of claim 12,
wherein the non-deterministic condition checking is performed conservatively, based on an assumption of no change in condition.

15. The method of claim 12,
- wherein the non-deterministic condition checking is performed aggressively, computing dispatch conditions for at least two alternatives including no change in condition and condition resolution; and
- wherein a control signal is selective for a particular one of the computed dispatch conditions.

* * * * *

UNITED STATES PATENT AND TRADEMARK OFFICE
CERTIFICATE OF CORRECTION

PATENT NO. : 7,430,653 B1
APPLICATION NO. : 09/583097
DATED : September 30, 2008
INVENTOR(S) : Marc Tremblay It is certified that error appears in the above-identified patent and that said Letters Patent is hereby corrected as shown below:

In Claim 7, Column 6 (line 56), please replace "group" with --grouping--;

In Claim 12, Column 8 (line 9), please replace "cycle" with --cycles--.

Signed and Sealed this

Eighteenth Day of November, 2008

JON W. DUDAS
*Director of the United States Patent and Trademark Office*